United States Patent [19]

Nossen

[11] Patent Number: 4,635,279
[45] Date of Patent: Jan. 6, 1987

[54] ARRANGEMENT FOR COHERENTLY GENERATING SINUSOIDS OF DIFFERENT FREQUENCIES, AND ANGLE MODULATION DATA RECEIVER USING THE ARRANGEMENT

[75] Inventor: Edward J. Nossen, Camden County, N.J.

[73] Assignee: RCA Corporation, Princeton, N.J.

[21] Appl. No.: 758,959

[22] Filed: Jul. 25, 1985

[51] Int. Cl.$^4$ .......................... H03D 3/00; H03K 9/06
[52] U.S. Cl. ........................................ 375/78; 375/90; 329/112; 364/721
[58] Field of Search ........................ 375/22, 44, 82, 88, 375/78, 47, 90; 179/84 VF; 307/261; 364/721; 328/24, 27; 329/2, 112

[56] References Cited

U.S. PATENT DOCUMENTS

| | | | |
|---|---|---|---|
| 4,249,447 | 2/1981 | Tomisawa | 264/721 |
| 4,331,941 | 5/1982 | Kovalick et al. | 328/24 |
| 4,346,448 | 8/1982 | Insam et al. | 364/721 |
| 4,412,250 | 10/1983 | Smith | 358/150 |
| 4,454,486 | 6/1984 | Hassun et al. | 364/721 |
| 4,486,846 | 12/1984 | McCallister et al. | 364/721 |
| 4,504,786 | 3/1985 | Slaughter | 324/78 R |
| 4,529,941 | 7/1985 | Lipoff | 329/112 |
| 4,539,524 | 9/1985 | Goode | 329/50 |
| 4,563,548 | 1/1986 | Misherghi et al. | 179/84 VF |

Primary Examiner—Robert L. Griffin
Assistant Examiner—Stephen Chin
Attorney, Agent, or Firm—Joseph S. Tripoli; Robert L. Troike; William H. Meise

[57] ABSTRACT

Data signals are angle-modulated onto a carrier in such a fashion as to suppress the carrier. Such modulation may be BPSK, MSK, QPSK, or OPQSK. The carrier may be subject to anomalous phase shifts, as may occur for example when the transmitter and receiver are in relative motion. In order to regenerate the carrier, the received signal is frequency-doubled (or quadrupled in the case of QPSK). The frequency doubled signal is demodulated by means of locally generated double-frequency demodulating signals to form baseband I and Q signals. The I and Q baseband information is evaluated over a predetermined time interval to establish the relative phase between the carrier of the double frequency signal and the double-frequency demodulating signal. At the end of each predetermined interval, the phase of the double-frequency demodulating signal is adjusted to be in-phase with the double-frequency carrier. The double-frequency demodulating signals are generated by addressing memories by at least parts of a recurrent digital sawtooth signal. Carrier-frequency demodulating signals are simultaneously generated by addressing other memories by means of the recurrent digital sawtooth signal. Because of the simultaneous addressing of the memories, the relative phases of the double-frequency and carrier-frequency signals are established by the programming of the memories. When the double-frequency demodulating signals are forced to the correct phase for demodulating the double-frequency signals at the end of each predetermined time interval, the carrier-frequency demodulating signals are also forced to correct phase for coherent low-noise demodulation of the data. The carrier-frequency demodulating signals are used to demodulate data modulated carrier delayed by the predetermined time interval.

20 Claims, 14 Drawing Figures

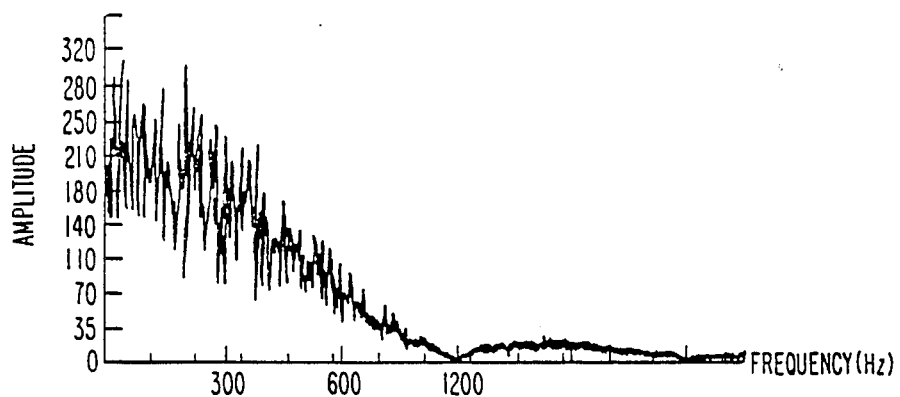
Fig. 2 BASEBAND SPECTRUM
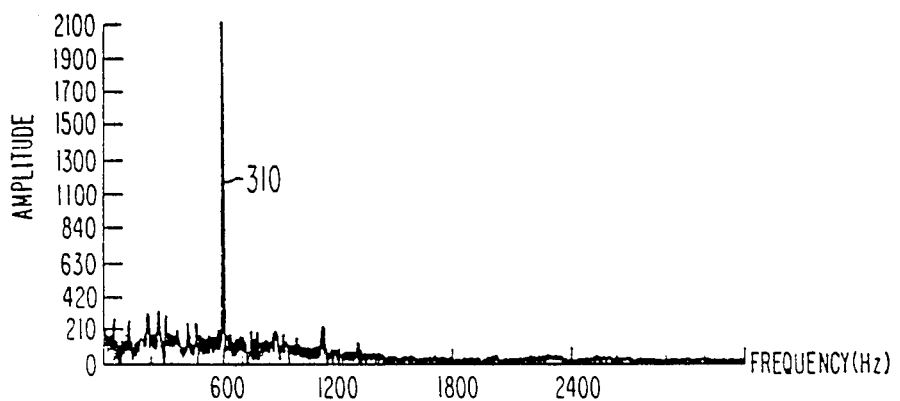
Fig. 3a FREQUENCY DOUBLED BASEBAND SPECTRUM

FREQUENCY DOUBLED SPECTRUM

ARRANGEMENT FOR COHERENTLY GENERATING SINUSOIDS OF DIFFERENT FREQUENCIES, AND ANGLE MODULATION DATA RECEIVER USING THE ARRANGEMENT

BACKGROUND OF THE INVENTION

This invention relates to arrangements for simultaneously generating sinusoidal signals at frequencies which are in a fixed relationship to each other, and to angle modulation data receivers for receiving frequency or phase modulated signals which use such signal generators to generate demodulating signals.

It is often desirable when transmitting signals modulated onto a carrier through a channel having substantial nonlinearities, as for example a channel including an amplifier subject to compression, to select a modulation method which maintains a constant carrier amplitude. Angle modulation is constant-amplitude modulation, and includes both frequency and phase modulation (FM and PM). The phase modulation techniques may include phase-shift keying (PSK), quadrature phase shift keying (QPSK) or offset QPSK (OQPSK).

Among the angle modulation techniques is frequency shift keying (FSK), which is the result of frequency modulating a carrier by means of bi-level digital signals. A bi-level digital information signal takes one of two states (logic high and logic low) depending upon the state of the digital information. According to one convention, a logic high level (HIGH) is called a MARK and a logic low level (LOW) is termed a SPACE. In frequency shift keying a MARK is represented by a first frequency and a SPACE by a second frequency. Minimum-shift keying or MSK is variant of FSK in which the deviation between the MARK and SPACE-representative modulated frequencies is one-half the bit rate. For example, for the case of a bit rate of 1200 bits-per-second (b/s), the deviation of the carriers is 600 Hertz (Hz), which corresponds to ±300 Hertz about the nominal carrier frequency. MSK modulation is advantageous because it is efficient in terms of the ratio of data rate to channel bandwidth (bits/sec/hertz). The carrier of an MSK-modulated signal is suppressed because there is no actual carrier at the nominal carrier frequency, and it is therefore not directly available to the receiver for generating a demodulating signal.

Because the MSK signal consists of MARK signals at frequency $F_1$ and SPACE signals at frequency $F_2$, it might appear that the frequency spectrum should include strong components of frequencies $F_1$ and $F_2$. The carrier signal for a string of symbols (MARK or SPACE) of the same type is a continuous signal at $F_1$ and $F_2$ and will in fact add in-phase to produce strong components. However, when the data stream is modulated by random symbols, the starting phase of the carrier for any symbol is established by the ending phase of the carrier for the preceding symbol. Since MSK carrier frequencies $F_1$ and $F_2$ are selected so that during each bit interval an even number of carrier cycles occur plus ($F_1$) and minus ($F_2$) a quarter carrier cycle, the phases of the two carriers rapidly reach a condition of bursts of in phase and quadrature phase carrier, which effectively suppresses the $F_1$ and $F_2$ frequencies. This suppression of the carrier is also characteristic of BPSK, QPSK or OQPSK and other phase shift keyed modulations.

Many demodulators of signals having a suppressed carrier apply the received signal to a frequency multiplying circuit to convert the data modulated signal to a frequency multiplied carrier frequency, which allows reconstruction of the carrier and thereby allows low noise coherent demodulation of a signal. Frequency doubling is used to recover the carrier of bi-phase modulated signals and of MSK signals, and frequency quadrupling of the signal is used to extract the carrier in the case of quadrature phase modulated signals.

In such receivers, the frequency doubled or frequency quadrupled carrier is maintained in a substantially constant phase relationship with a locally generated oscillator which is nominally at the same frequency as the frequency multiplied carrier. The actual demodulation of the signal is accomplished by a demodulating signal which is at the actual carrier frequency. Consequently, the actual demodulating signal is at a submultiple of the frequency of the locally generated oscillator signal which is locked to the frequency multiplied carrier of the received signal. Thus, the receiver includes a demodulating signal generator which is locked to a submultiple of the frequency of a higher frequency locally generated signal. The locking together of two oscillators which are at different frequencies is normally accomplished by a counter coupled to the higher frequency oscillator which counts down to the lower frequency for phase locking to the lower frequency oscillator by means of a phase lock loop (PLL). The narrow bandwidth typical of a PLL prevents rapid changes of phase of the oscillators such as may be required when adjusting the phase to generate demodulating signals for burst communications. A scheme is desirable in which signals at disparate frequencies may be generated coherently and in a manner such that rapid phase changes may be made to both signals.

SUMMARY OF THE INVENTION

An arrangement for generating pairs of coherent sinusoidal signals at different frequencies includes a sawtooth generator for generating recurrent digital ramp signals or sawtooth signals. A first memory arrangement is coupled to the sawtooth generator for being addressed thereby. The first memory is preprogrammed for generating the first of the two coherent sinusoidal signals. Each complete cycle of the first sinusoidal signal occurs during a time equal to the duration of a first part of one of the ramp signals. A second memory is coupled to the sawtooth generator for being addressed thereby. The second memory is preprogrammed for generating the second of the two coherent sinusoidal signals. Each complete cycle of the second signal occurs during a time equal to the duration of a second portion of the one ramp signal. The duration of the second portion of a ramp signal is less than the duration of the first portion so that the duration of the complete cycle of the second signal is less than the duration of a complete cycle of the first signal. During recurrent addressing of the first and second memories by the sawtooth signals, the first and second signals are coherently produced at first and second frequencies, respectively.

In a particular embodiment of the invention, each of the first and second memories is addressed by the same bits of the digital sawtooth signal, and the preprogrammed signal embedded in the second memory causes more than a single cycle of the second signal to occur when addressed by that portion of each digital ramp signal which causes the first memory to produce a single cycle of the first signal.

In another embodiment of the invention, the second memory is addressed by a subset of the bits of the digital sawtooth signal which address the first memory in such a fashion that the addresses of the second memory are recurrently scanned during the same interval in which the addresses of the first memory are scanned once.

DESCRIPTION OF THE DRAWING

FIG. 2 is an amplitude-versus-frequency plot illustrating the spectral distribution of a signal such as that illustrated in FIG. 1;

FIGS. 3a and 3b are baseband and IF-frequency amplitude-versus-frequency plots of the spectrum of FIG. 2 after doubling in frequency and filtering with a narrow bandwidth;

DESCRIPTION OF THE INVENTION

Figure 1:
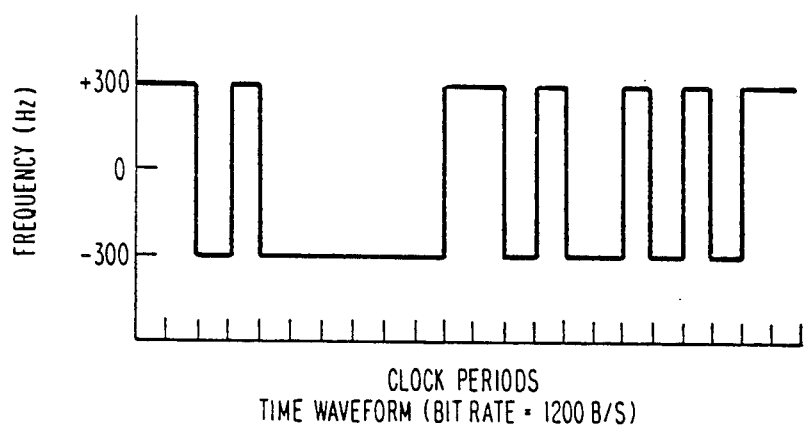
FIG. 1 is a frequency-versus-time plot of an arbitrary information signal modulated onto a carrier.
Figure 3B:
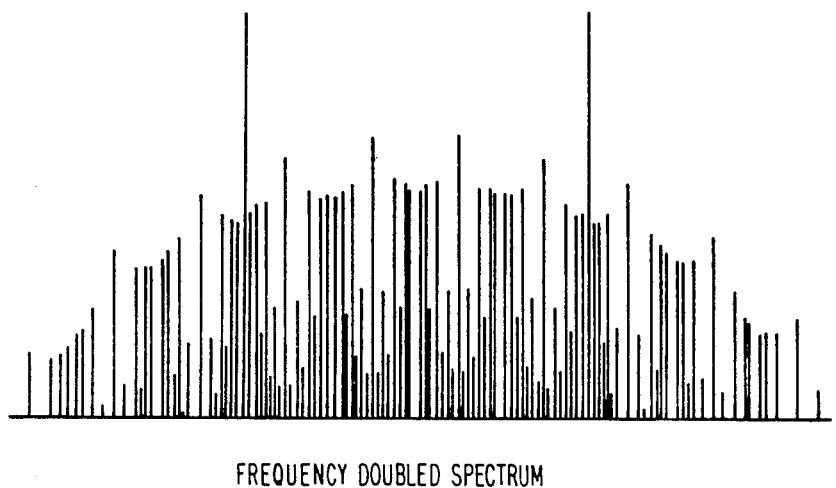

FIG. 1 illustrates the frequency-versus-time plot of an arbitrary information signal which frequency-modulates a carrier. The modulation may represent a general frequency modulation or MSK modulation. As known, the deviation of an MSK-modulated carrier is equal to half the bit rate, so that if the bit rate of the signal represented in FIG. 1 is 1200 bits/sec (b/s), the total frequency deviation is 1200/2=600 Hertz (Hz), which is plus or minus 300 Hz. Thus, each Mark is represented by a frequency of 300 Hz above the nominal carrier frequency (indicated in FIG. 1 as zero frequency), and each Space is represented by a carrier 300 Hz below the carrier frequency. Since there is no dwell time at the actual carrier frequency, the carrier is suppressed as illustrated in FIG. 2. FIG. 2 is an amplitude spectrum representing the single sided baseband energy distribution of the MSK-modulated signal of FIG. 1. The modulated signal has been translated from the radio frequency (RF) or intermediate frequency (IF) carrier to bandbase, thereby causing the negative frequency spectrum to fold over on top of the positive frequency spectrum. As can be seen from FIG. 2, the suppressed carrier, and the location of the carrier are not apparent. FIG. 3a represents an amplitude-frequency spectrum plot of the energy distribution resulting from frequency-doubling the baseband spectrum illustrated in FIG. 2. FIG. 3b is the equivalent IF-frequency spectrum shown on a logarithmic scale. As can be seen, the spectrum includes an energy spike occurring at 600 Hertz, which is twice the deviation of the carrier attributable to either a Mark or Space. The amplitude of the spike 310 is so large that very little received energy is required in order to make it clearly visible.

Figure 4:
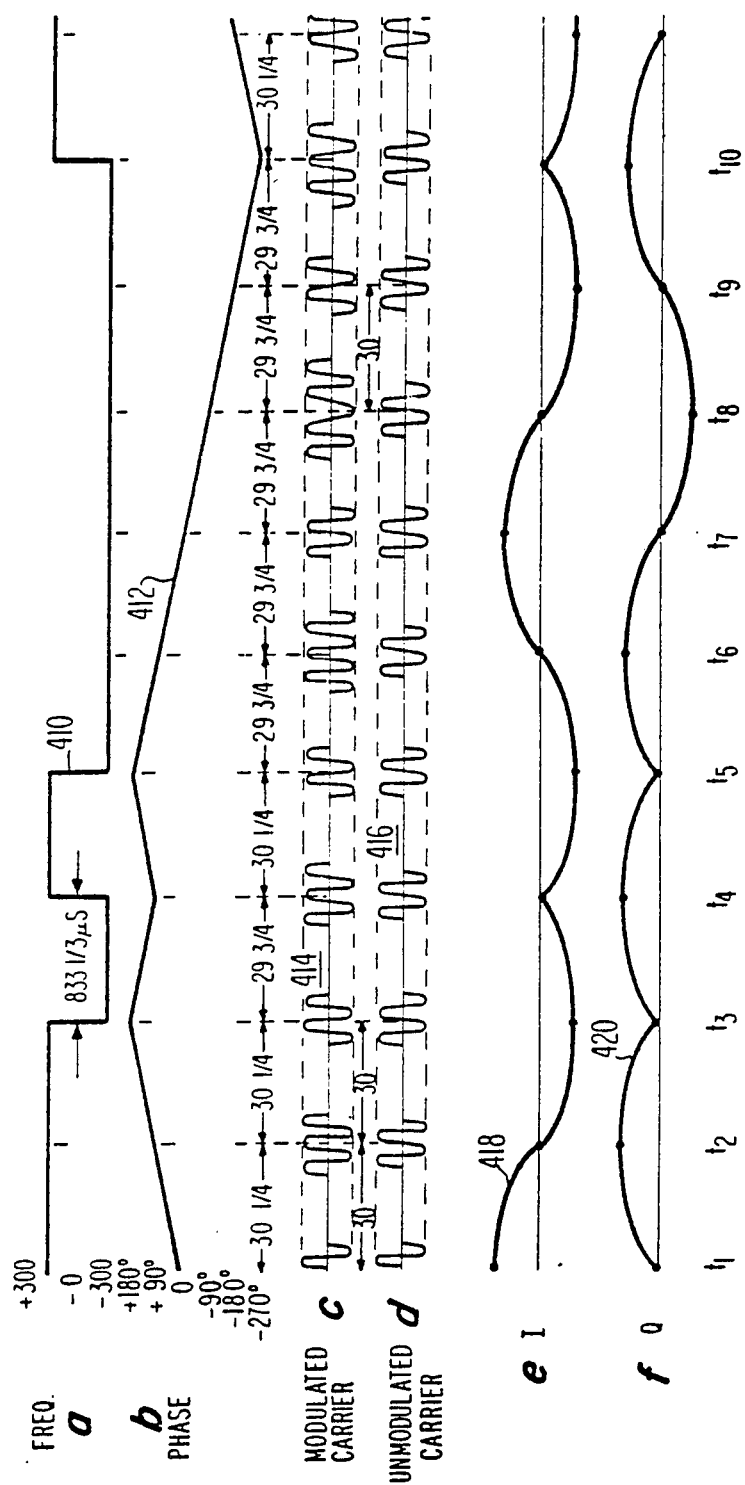
FIG. 4 illustrates amplitude-versus-time plots of MSK signals aiding in understanding the invention.

An arbitrarily selected digital information or data signal 410 illustrated in FIG. 4a has a 1200 bit-per-second data rate, corresponding to a bit duration of 833⅓ microseconds (μS). As illustrated in FIG. 4a, the MARK (logic HIGH) portions of data signal 410 are assigned a modulated carrier frequency 300 Hz. above the nominal carrier frequency and the SPACE portions are assigned a modulated carrier frequency 300 Hz. below the nominal carrier frequency. As mentioned, data signal 410 dwells only at a MARK or at a SPACE, and has no dwell time at a data level corresponding to the carrier frequency. Consequently, the phase of frequency modulated data signal or carrier 414 (FIG. 4c) relative to the unmodulated carrier 416 (FIG. 4d) is a ramp having a positive slope during MARK intervals and a negative slope during SPACE intervals as illustrated by phase characteristic 412 of FIG. 4b. For MSK modulation the slope of phase characteristic 412 is 90° per bit interval. For example, in the interval $t_1$-$t_2$ during which the modulated MSK carrier represents a MARK, the phase of the modulated carrier relative to the unmodulated carrier increases from zero to plus 90°. As illustrated in FIG. 4c and 4d, this means that the modulated carrier 414 is at a frequency such that an even number of cycles plus ¼ cycle occurs during each bit interval, while the unmodulated carrier 416 is at a frequency which results in only an integer number of cycles during the same interval. As illustrated, the integer number of cycles is 30, which defines the unmodulated carrier frequency as $$f_c = 30 \text{ cycles}/833.33 \ (10^{-6}) \text{ sec} = 36 \text{ KHz}$$

The phase of modulated carrier 414 continues to increase by a further 90° during the time interval $t_2$-$t_3$, resulting in a further interval having 30¼ cycles. As a result, at time $t_3$ the modulated carrier and the unmodulated carrier are mutually out-of-phase. During the interval $t_3$-$t_4$, the information signal 410 defines a SPACE. During SPACE intervals, the slope of phase characteristic 412 is −90° per bit interval. Consequently, during the interval $t_3$-$t_4$ the phase returns to the same phase which existed at time $t_2$. FIG. 4e illustrates as 418 a plot of the multiplicative product of MSK modulated carrier 414 and unmodulated carrier 416, and FIG. 4f illustrates as 420 a plot of the multiplicative produce of MSK modulated carrier 414 and an unmodulated carrier in phase quadrature with carrier 416 (not illustrated).

In a demodulator for demodulating data signals angle modulated onto a carrier, the lowest noise is achieved by coherent demodulation or synchronous detection. This requires regenerating the carrier which in this context means locally generating a demodulating signal having the same frequency and substantially the same phase as the suppressed carrier. When such a regenerated carrier is available, mutually quadrature versions (components) of the demodulating signal may be applied to the demodulating multipliers together with the signal to be demodulated. When the carrier is suppressed, the objects to be accomplished then becomes phase coherent generation of carrier-frequency demodulating signals and frequency-multiplied demodulating signals.

Figure 5:
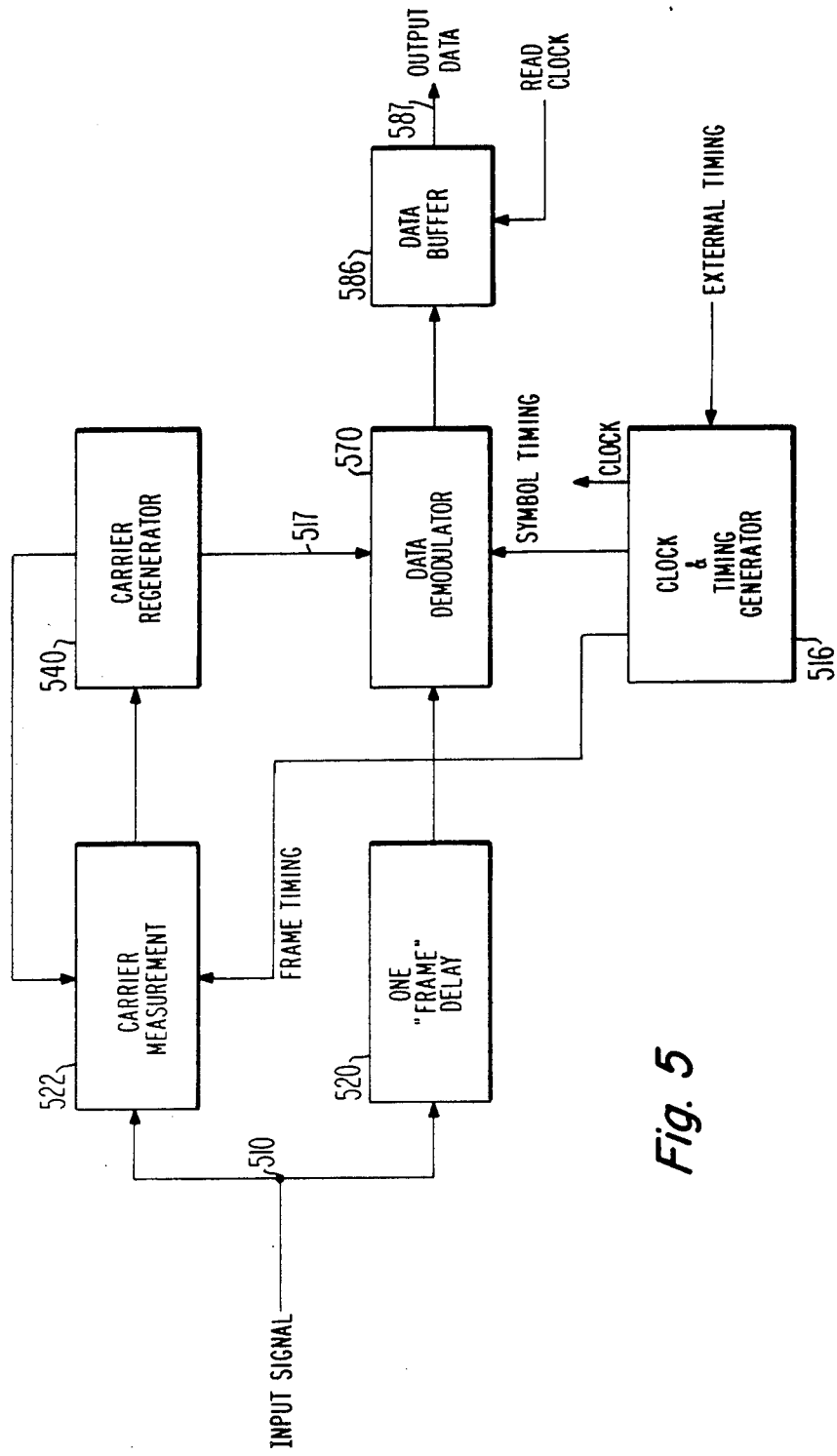
FIG. 5 is a simplified block diagram of a data receiver according to the invention which is adapted for receiving BPSK, QPSK, MSK and other angle modulated data signals.
Figure 6:
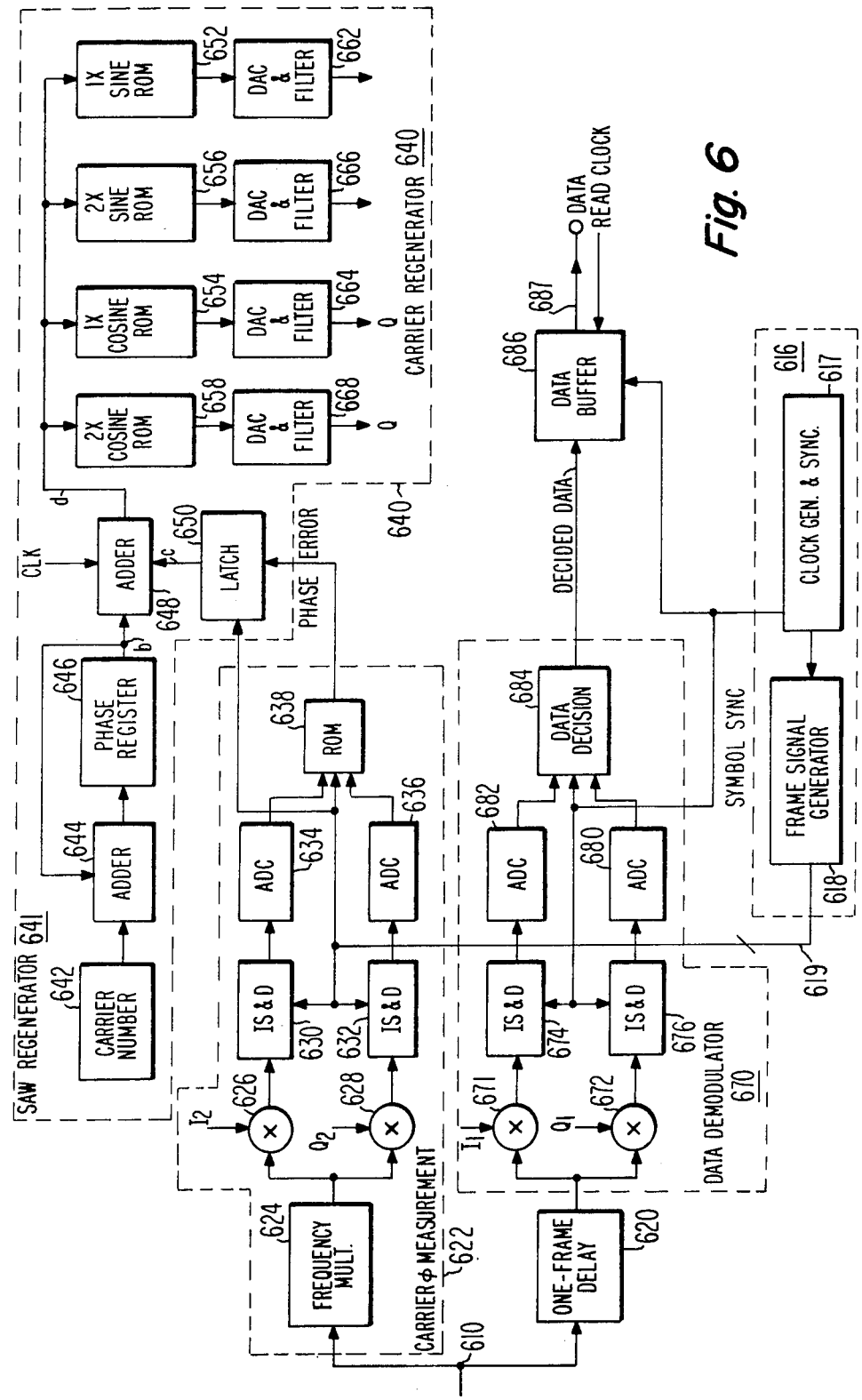
FIG. 6 is a more detailed block diagram of the data receiver of FIG. 5 illustrating details of a carrier regenerator suitable for BPSK or QPSK.

FIG. 5 is a simplified block diagram of a receiver according to the invention. In FIG. 5, input signals which may be data signals PSK, QPSK, MSK or otherwise angle modulated onto a carrier are applied by way of an input terminal 510 to a delay block 520 and to carrier measurement block 522. The carrier measurement block 522 controls a carrier regenerator 540 which generates on a conductor 517 a demodulating signal which is applied to a data demodulator 570 together with delayed data signal from delay element 520. A demodulated signal is taken from demodulator 570 and is applied to a data buffer 586 which is read by a locally generated read clock to produce the desired output data on a conductor 587. Timing of the carrier measurement circuit and of the demodulator are controlled by a clock and timing generator illustrated as 516. FIG. 6 is a more detailed block diagram of the arrangement of FIG. 5. In FIG. 6, major elements corresponding to blocks of FIG. 5 are identified by the same reference numbers in the 600 series rather than the 500 series. In FIG. 6, angle modulated signals are applied by way of an input terminal 610 to a one frame delay 620 and to a frequency multiplier 624 of a carrier phase measurement arrangement 622. For PSK signals, frequency multiplier 624 multiplies frequency by two, and for QPSK and OQPSK, the multiplication is by a factor of four. The frequency multiplied signals from frequency multiplier 624 are applied to a pair of multipliers 626 and 628, each of which receives one of a pair of mutually quadrature phase demodulating signals $I_2$ and $Q_2$ at the nominal frequency of the expected frequency multiplied carrier. For example in the case of receipt of signals at a carrier frequency of 36 KHz, $I_2$ and $Q_2$ are at a nominal frequency of 72 KHz. The generation of $I_2$ and $Q_2$ is discussed below. The frequency doubled received signals are demodulated by multipliers 626 and 628. The demodulated signals from multipliers 626 and 628 are applied to integrate, sample and dump (IS&D) filters 630 and 632, respectively. Filters 630 and 632 integrate their respective received and demodulated signals for the duration of one frame interval, as described below. At the end of each frame interval, the filtered signals are applied from IS&D filters 630 and 632 to analog-to-digital converters (ADC) 634 and 636, respectively, and after transfer of signal from the filters and ADC conversion of the signal the IS&D filters are dumped or reset in readiness for integration during the next frame interval.

Figure 7:
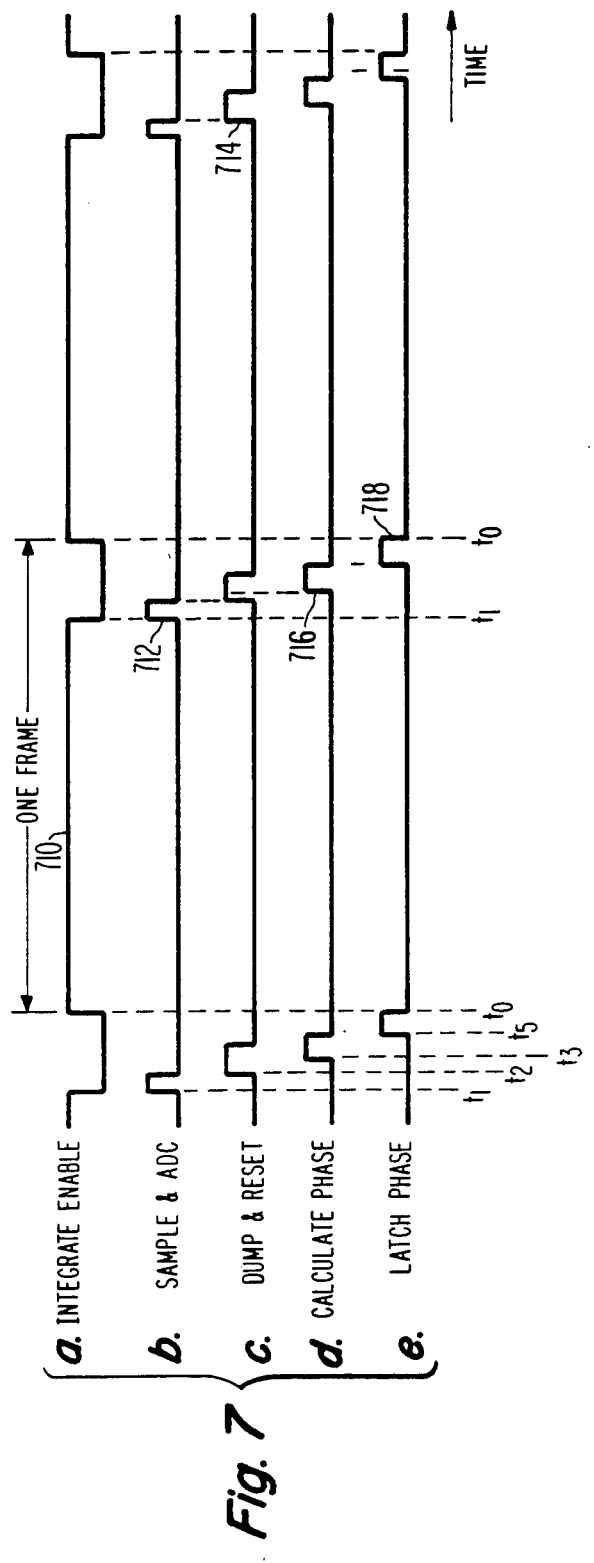
FIG. 7 waveforms 7a-7e illustrate timing signals aiding in understanding the operation of the receiver of FIG. 6.

FIGS. 7a-c illustrate the timing of filters 630, 632, ADC 634 and ADC 636. As illustrated in FIG. 7, one frame interval is an arbitrary length of time extending from a time $t_0$ to the next following time $t_0$. The duration of one frame is selected in view of the anticipated amount of phase shift of the received carrier relative to the demodulating signals. The frame interval is selected so that only a relatively small phase shift of the carrier occurs during the frame interval. For this purpose, a small phase shift is one in which a relatively small amplitude change of the output signals of the I and Q multipliers 626 and 628 occurs due to phase shift of the carrier over one frame interval. The timing signals represented by waveforms 710-718 of FIG. 7 are distributed over a multiconductor bus 619 for use as described below. As illustrated in FIG. 7, IS&D filters 630 and 632 are recurrently enabled for integration by signal 710 beginning at time $t_0$ and ending at a later time $t_1$. At time $t_1$, as illustrated in FIG. 7b, a signal 712 causes the integrated signal held in filters 630 and 632 to be sampled for application to ADC 634 and 636, respectively, and causes conversion of the sampled signals to digital form. At each recurrent time $t_2$ at least the sampling portion of the sampling and ADC conversion step initiated by 712 has been completed, and dumping of the remaining charge on I,S and D filters 630 and 632 is initiated by the leading edge of a signal 714 to reset the filters in preparation to the next following integration portion of the frame interval. As described below, actual integration does not begin until a slightly later time $t_0$ at which the phases of the double frequency demodulating signals $I_2$ and $Q_2$ have been readjusted to match the phase of the double frequency carrier from frequency multiplier 624.

The amplitudes represented by the signals produced by ADC 634 and 636 after time $t_2$ near the end of each frame interval depend upon the relative phase between the frequency multiplied carrier from frequency multiplier 624 and the mutually quadrature double frequency demodulating signals $I_2$ and $Q_2$. As mentioned, the duration of a frame interval is selected short enough so that no significant change in phase occurs between the double frequency carrier and the double frequency demodulating signals $I_2$ and $Q_2$. As a result, the signal represented by the output of ADC 634 will be a maximum if $I_2$ is substantially in-phase with the double frequency carrier, and the output of 636 will represent substantially zero. On the other hand, if double frequency demodulating signal $Q_2$ is in-phase with the double frequency carrier, the output signal from ADC 636 will represent a maximum and the output from ADC 634 will represent zero amplitude. Relative phases lying between these extremes are represented by finite signal amplitudes from both ADC 634 and 636. The phase relationship $\phi$ is given by an expression including the arctangent of the ratio of the amplitudes:

$$\phi = \arctan Q/I$$

A phase error signal is produced by ROM 638 during an interval $t_3-t_5$ near the end of each integrating cycle in response to clocking by a signal 716 (FIG. 7d) and to addressing by digital signals from ADC 634 and 636, as described above. This phase error signal represents the phase difference between the double frequency carrier and the double frequency demodulating signal represented by $I_2$ and $Q_2$. The phase error signal is precomputed for all possible input or address values and the results loaded into ROM 638 at appropriate memory locations. The phase error signal is applied to a latch 650 where it is latched by a signal 718 at a time after time $t_5$ by signal 718 illustrated in FIG. 7e. As described below, the double frequency demodulating signal and the data demodulating signal are slewed towards the desired or predetermined phase by the latched phase error signal during the interval $t_5-t_0$, corresponding to the last portion of each frame interval. Thereafter, demodulation occurs during the next frame interval with the corrected phase, and the carrier phase determining procedure as described above begins again. The phase error signal from ROM 638 controls carrier regenerator 640 to set the phase of carrier frequency demodulating signals $I_1$ and $Q_1$ to the desired phase and the double frequency demodulating signals $I_2$ and $Q_2$ to a corresponding desired phase during the interval $t_5-t_0$ following each frame integration interval. $I_2$ is set in-phase with a double frequency carrier, and $Q_2$ is therefore in quadrature therewith. During the following interval $t_0$ and $t_1$, this phase relationship is maintained. As will be described, $I_1$ is controlled to be in-phase with the data carrier signal, and $Q_1$ is in quadrature therewith.

Data signals modulated onto a data carrier are applied from one frame delay 620 to multipliers 671 and 672 of a data demodulator designated generally as 670 together with demodulating signals $I_1$ and $Q_1$, respectively. Demodulating signals $I_1$ and $Q_1$ are phase controlled during the last moments ($t_5-t_0$) of each frame interval to be in phase with the data carrier of the signals received at input terminal 610 during the frame interval preceding the frame interval of the signals currently being received. Thus, the modulated data signals currently applied from one-frame delay 620 to multipliers 671 and 672 are demodulated by carriers which are at the current phase, subject to only minor errors. As an example of such a minor error, the correct demodulating signal phase as determined by carrier phase measurement circuit 622 is an average taken over portion $t_0-t_1$ of each frame interval which may not exactly correspond with the average over a complete interval $t_0-t_0$. Demodulated data signals are coupled from multipliers 671 and 672 to IS&D filters 674 and 676, respectively, which integrate the signal over an integrating interval in a manner similar to that described in conjunction with filters 630 and 632. However, steps d and e are not required in real time. Also, the frame interval will generally be greater than the bit interval. The integrated signals are applied to ADC circuits 680 and 682 for conversion to digital form, and the digital signals so converted are applied to a data decision circuit 684. The decided data is applied from decision circuit 684 to data buffer 686 where it is stored temporarily and resynchronized to a local read clock signal for application by way of conductor 687 to utilization circuits (not illustrated).

Figure 8:
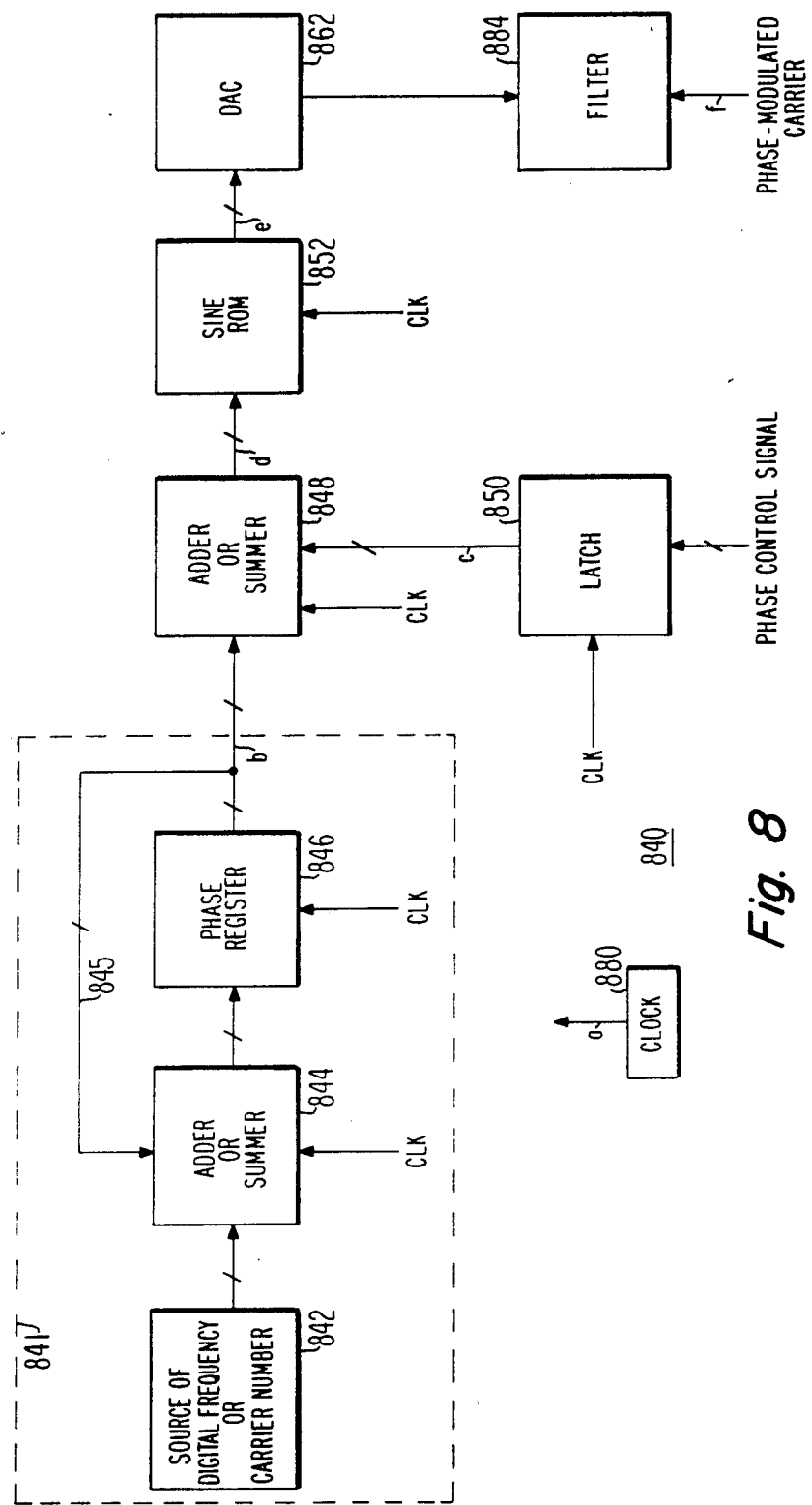
FIG. 8 is a simplified block diagram of the carrier regenerator of FIG. 6.

FIG. 8 is a simplified block diagram of carrier regenerator 640. In FIG. 8, elements corresponding to those of carrier regenerator 640 are designated by the same reference number in the 800 series rather than in the 600 series. In FIG. 8, a phase modulated generator designated generally as 840 includes a digital sawtooth signal generator 841, which includes a source 842 of a digital frequency number which establishes the frequency of the carrier signal to be phase modulated, as described below. The digital frequency number is preselected to establish the nominal frequency of the demodulating signal and does not ordinarily change during operation. The frequency number is applied to a clocked adder or summer 844 in which the digital number is added to the digital value applied to the second input of the adder over a conductor set 845. Conductor set 845 may include more than a single conductor, as suggested by the slash mark, for carrying multiple simultaneous bits. For simplicity, such sets will hereinafter be termed simply "conductor" and each terminal to which such a conductor connects will be termed a terminal, no matter how many conductors terminate therein. Adder 844 adds together at each clock cycle the digital frequency number and the digital signal applied to its second input over conductor 845 to produce a sum signal which is applied to a phase register or latch 846 which latches the sum signal and which supplies the latched sum signal back over conductor 845 to the input of adder 844. In this arrangement, a digital word is generated at the output of register 846 the value of which increments by the frequency number at each clock cycle. Thus, the digital number on conductor b is a digital number representing or equivalent to the quantized ramp signal 916 of FIG. 9. When there is more than one ramp 916 as when the ramps are recurrent, signal 916 is termed a sawtooth. It is of course understood that the digital representation is by means of a plurality of ones and zeros as is well known in the art. The monotonically increasing digital number on conductor b eventually causes register 846 to overflow and to start again from a near-zero value, thereby causing the digital number on conductor b to recurrently drop to or near zero value and to increment during each clock cycle by the magnitude of the digital frequency number. The number of stages of register 846, the clock recurrence rate and the magnitude of the digital frequency number are selected so that the digital number on conductor b produces a recurrent ramp or sawtooth-representative signal which recurs at the recurrence rate of the demodulating signal to be generated. Thus, one cycle of ramp 916 of the sawtooth-representative signal 1012 occurs in the same interval as one cycle of the sinusoidal demodulating signal. A clock signal generator illustrated as 880 produces, on conductor labeled a, clock signals represented as 1010 in FIG. 10a which are at a frequency which is high relative to the frequency defined by the recurrence rate of the individual ramps 916 of digital sawtooth signal 1012. The clock signals are applied to adder 844, register 846 and to other timed elements in carrier regenerator 840.

Figure 10:
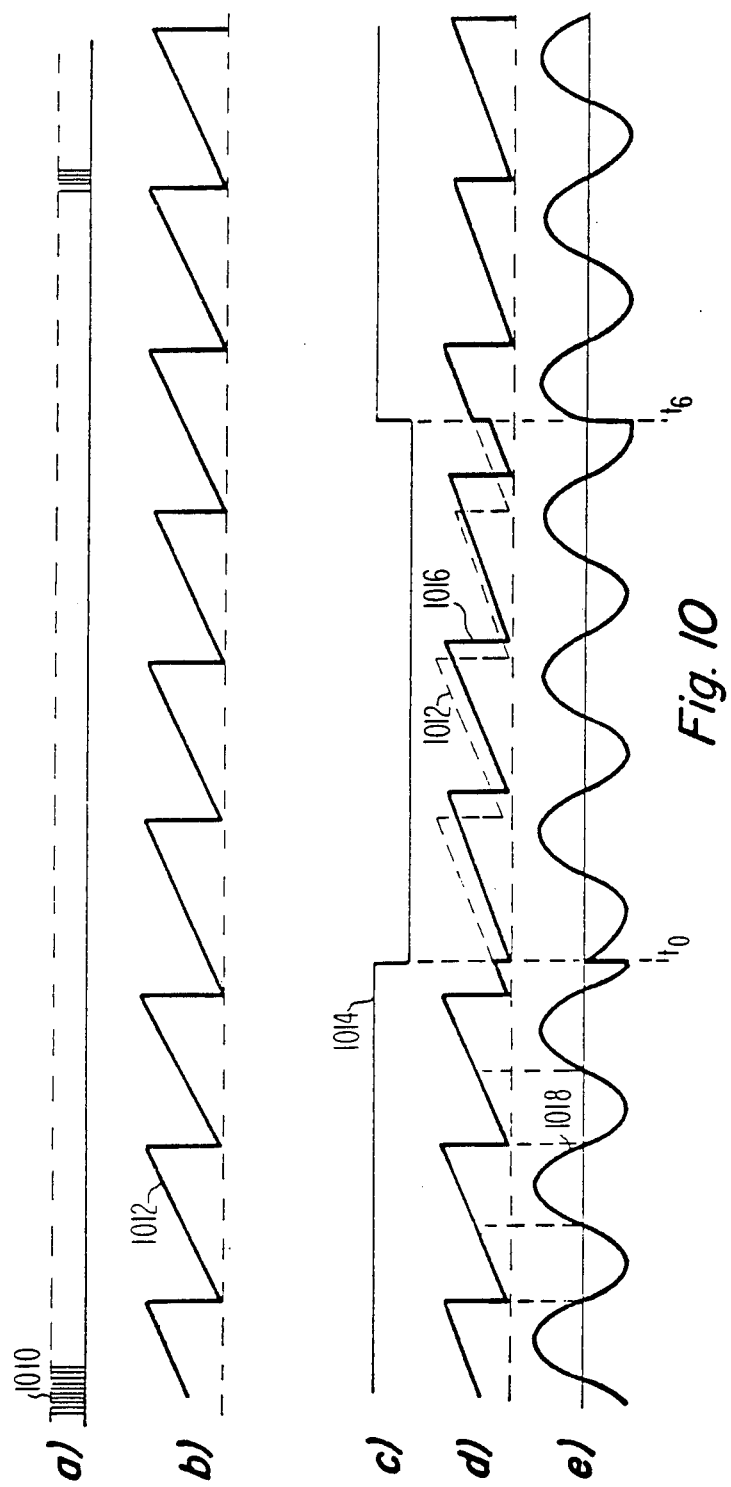

The digital sawtooth representative signal on conductor b is applied to a first input terminal of a clocked adder or summer 848. Digital phase information or a phase modulating signal is applied to a second input terminal of adder 848 over conductor c from latch 850. Adder 848 at each clock cycle adds together the current value of the digital sawtooth signal applied from conductor b and the digital phase modulation signal from conductor c to produce a phase shifted sawtooth signal on conductor d. Adder 848 overflows when the sum of the digital sawtooth signal and the digital phase modulation signal exceeds the peak value of the digital sawtooth signal along. This may be better understood by reference to FIGS. 10c and 10d. In FIG. 10c, two-level waveform 1014 represents in simplified form the signal which is to step-correct or modulate the phase of the demodulating signal. The desired modulation as illustrated by 1014 is simply a first phase before time $t_0$, a second phase in the interval $t_0-t_6$ and a return to the original phase condition at times after time $t_6$. Time $t_0$ may represent the beginning of one frame and time $t_6$ the end of the frame. Waveform 1016 in the interval prior to time $t_0$ represents the sawtooth output of adder 848 in-phase with the input signal 1012, thereby indicating that no phase shift has taken place, or that the magnitude of the digital phase modulation signal applied to adder 848 over conductor c has zero magnitude. At time $t_0$, a digital value is applied over conductor c to adder 848 and is added to the value of the sawtooth. Since the digital phase modulation signal 1014 on conductor c has a constant value as represented in FIG. 10c, its addition to the sawtooth signal represents a simple magnitude offset, such as the offset indicated at time $t_0$. As illustrated, the adder digital phase modulation signal has a negative value which happens to reduce the sawtooth signal to a value near zero at time $t_0$ and consequently the digital phase modulation signal as illustrated has an approximate magnitude of one fourth of the peak value of the sawtooth. For this particular value of digital phase modulation signal, a phase delay of the sawtooth 1016 relative to the digital sawtooth 1012 results, as can be seen by comparing waveform 1016 with the dashed line in the interval $t_0$–$t_6$ representing sawtooth 1012. After time $t_6$, the digital phase modulation signal returns to zero value, and the negative magnitude no longer affects the sawtooth waveform, which thereupon makes a step increase in magnitude so as to become once again congruent with digital sawtooth waveform 1012. Thus, it can be seen that adder 848 causes a phase shift of the sawtooth signal which depends upon the magnitude of the modulating signal.

Figure 9:
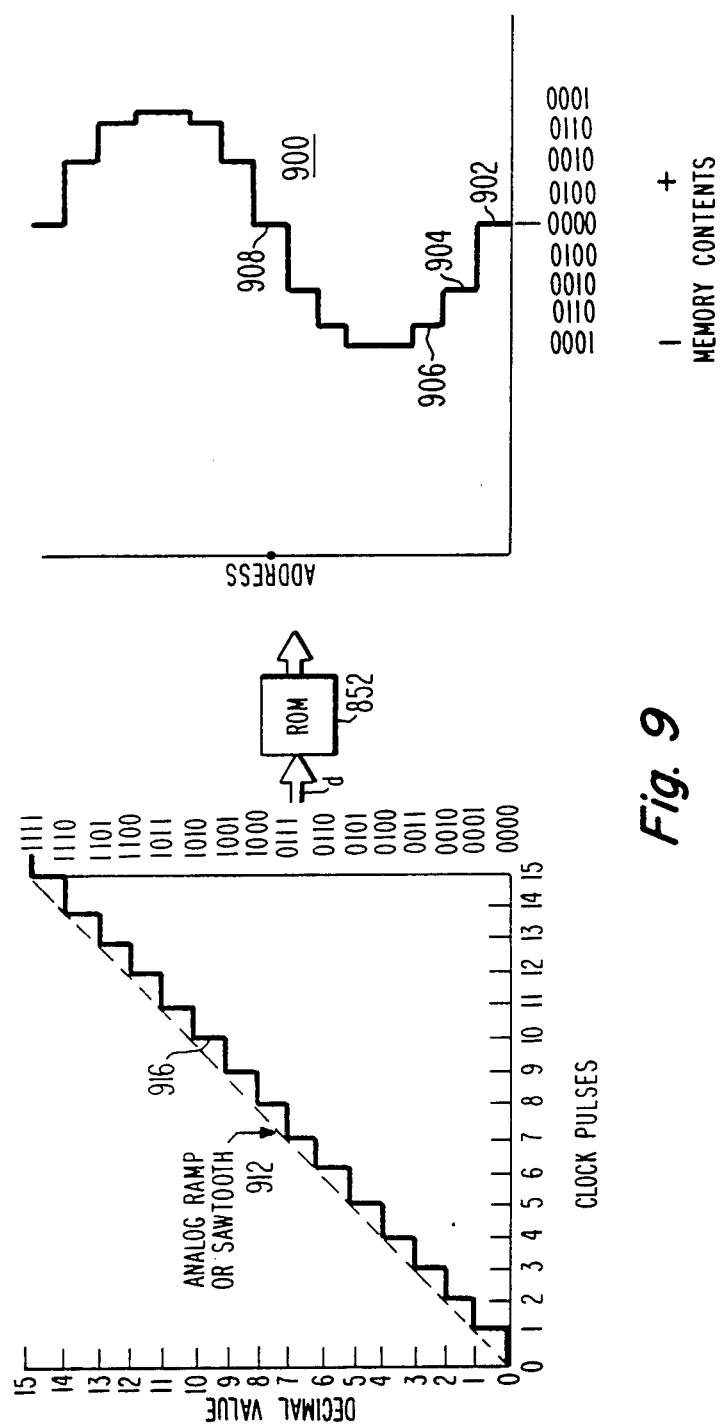
FIGS. 9 and 10 are diagrams representing signals occurring in the arrangement of FIG. 8 as an aid in understanding the operation thereof.

The phase modulated signal produced as the output of adder 848 in FIG. 8 is applied over a conductor d to a sine ROM 852. ROM 852 is an addressable memory which is addressed by digital signals on conductor d and which is preprogrammed with values representing a sinusoid. This is more easily understood by reference to FIG. 9. In FIG. 9, waveform 912 represents in analog form the value of a single ramp of a sawtooth signal for various clock pulses. Actual conversion of digital signals to analog occurs at digital-to-analog converter 862. The analog value represented by the sawtooth is indicated at the left of waveform 912, and the corresponding four bit digital value of corresponding quantized waveform 916 is represented on the right. The four bit values represented by digital signal 916 are illustrated as being applied as addresses to ROM 852, and the corresponding preprogrammed values are illustrated by waveform 900. For example, the memory locations of ROM 852 corresponding to addresses 0000 and 1000 are each preprogrammed with digital values 0000, and correspond to levels 902 and 908, respectively. These are the zero crossings of the equivalent sinusoid. Since waveform 900 represents a single cycle of sinusoid, there are only two zero crossings. Thus, as sawtooth 916 recurrently takes excursions from 0000 to 1111, ROM 852 outputs digital numbers including numbers corresponding to levels 902 and 908, which are representative of zero crossings of the single sinusoid. During the first or lower part of sawtooth 916, ROM 852 is scanned by applying addresses 0000 to 0111 to its address inputs to produce outputs from the ROM representing the negative half-cycle of sinusoid 900, including first-zero crossing 902. The second or upper portion of sawtooth 916, having values ranging from 1000 to 1111, produce memory outputs which represent the values of the positive half-cycle of the sinusoid, including second zero crossing 908. Naturally, the number of quantization levels is selected to provide as accurate a representation of a sinusoid as may be desired. Thus, the recurrent excursions from 0000 to 1111 of sawtooth 916 produces recurrent negative and positive-going excursions of the digitized sinusoid 900.

Referring once again to FIG. 8, the recurrent sawtooth signal 1012 applied to sine ROM 852 produces on conductor e a digital signal representative of a sinusoid 1018, illustrated in FIG. 10e. The return to zero value of sawtooth 1016 at time $t_0$ as a result of phase modulation causes the digital address applied to sine ROM 852 to drop to its initial value, and thereby causes sine ROM 852 to produce a digital signal representing zero value for the first clock cycle after time $t_0$. This zero value at time $t_0$ represents a first zero crossing of sinusoid 1018.

Subsequent to time $t_0$, waveform 1016 is phase shifted, and complete phase shifted sinusoids are produced by sine ROM 852 until later time $t_6$, at which time there is an abrupt positive-going change in magnitude of waveform 1016 to a value which is half-way up the sawtooth, thereby causing sine ROM 852 to produce the corresponding portion of a sinusoid, which happens to again be near zero value. Thus, that portion of sinusoid 1018 preceding time $t_0$ is in-phase or coherent with that portion following time $t_6$. The phase shifting of sawtooth address waveform 1016 by which ROM 852 is addressed causes a corresponding phase shift of the sinusoid-representative digital output signal 1018 from sine ROM 852. Digital signal 1018 is applied from ROM 852 to a digital-to-analog converter (DAC) 862 to produce a quantized analog sinusoid corresponding to the digital signal. Quantization noise is removed by a filter 884 to produce an output conductor f a sinusoidal carrier, the recurrence rate of which tracks the recurrence rate of sawtooth signal 1012, with phase modulation imparted by phase modulating signal. As so far described, the arrangement of FIG. 8 is a phase modulator such as that described in U.S. patent application, Ser. No. 687,546, filed Dec. 28, 1984, in the name of E. J. Nossen.

Figure 11:
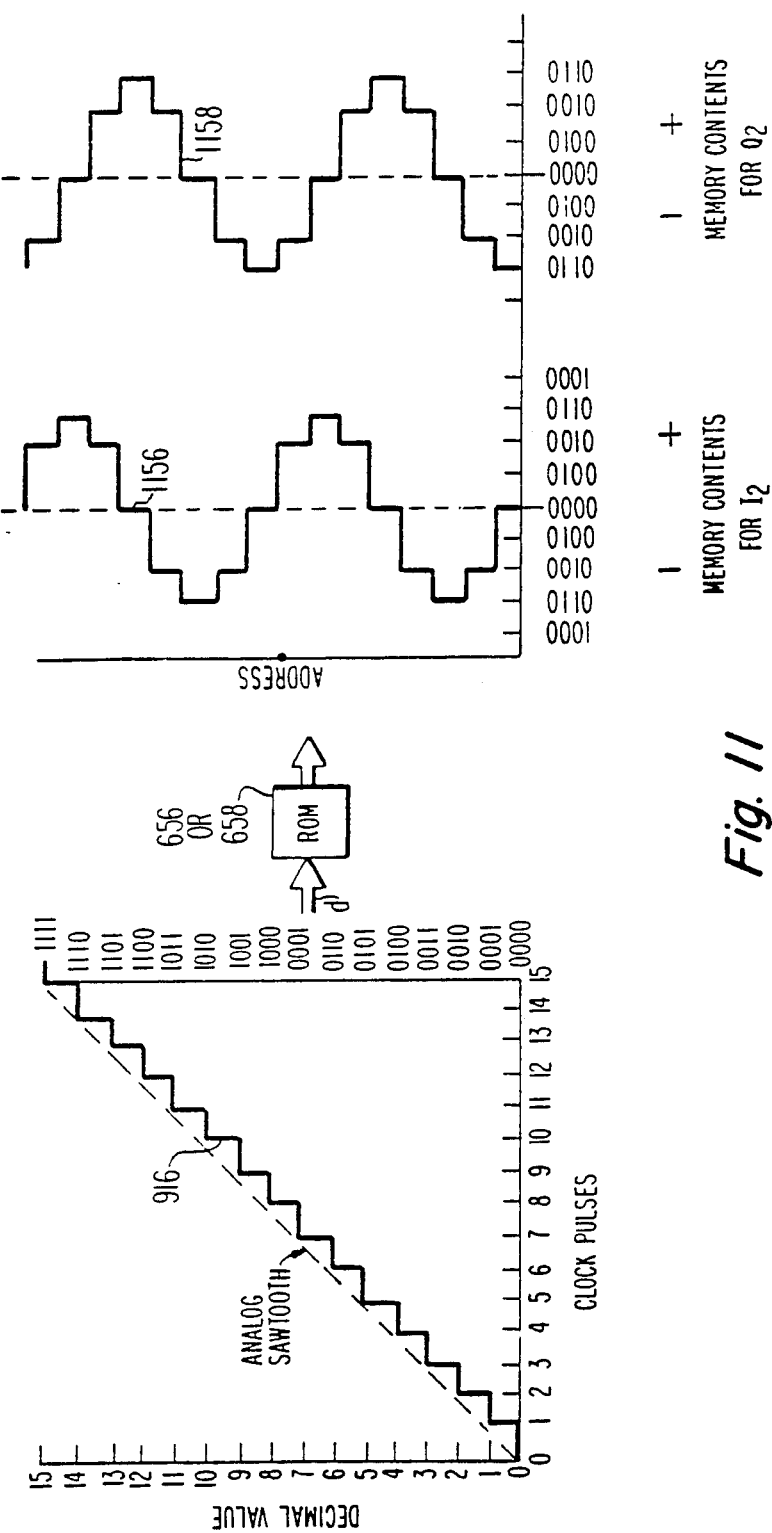
FIG. 11 is a diagram representing signals occurring in the arrangement of FIG. 6 as an aid in understanding the invention.

Referring once again to FIG. 6, carrier regenerator 640 is seen to include a cosine ROM 654 in addition to sine ROM 652. Cosine ROM 654 receives the digital sawtooth signal such as 916 of FIG. 9, and is preprogrammed to complete one cycle of sinusoid for each recurrent sawtooth cycle, as in the case of sine ROM 652. However, cosine ROM 654 is programmed to produce a maximum signal is response to addresses 0000 and 1000, whereupon the resulting sinusoid is phase shifted by 90° with respect to a sinusoid such as 900 of FIG. 9. Thus, carrier regenerator 640 produces from ROMS 652 and 654 mutually quadrature signals $I_1$ and $Q_1$, respectively, at a recurrence rate equal to the recurrence rate of the sawtooth signals produced by sawtooth generator 641. Carrier regenerator 640 also includes double-frequency (2x) sine and cosine ROMs 666 and 658, and their corresponding digital-to-analog converters and filters 656 and 668. The operation of ROMs 656 and 658 is illustrated in conjunction with FIG. 11. In FIG. 11, digital sawtooth waveform 916 is illustrated as being applied over conductor d to ROMS 656 or 658. ROM 656 is preprogrammed for responding to the monotonic application of addresses for producing two complete cycles of a sinusoidal signal illustrated as 1156 in response to a single cycle of sawtooth 916. Thus, the effective recurrence rate of sinusoidal signal 1156 is twice the recurrence rate of digital sawtooth signal 916. Consequently, the frequency of sinusoidal signal 1156 is double the frequency of the sawtooth signal produced by sawtooth generator 641, and is also double the frequency of the sinusoidal signals produced by ROMs 652 and 654. As illustrated in FIG. 11, ROM 658 is preprogrammed for producing two complete cycles of sinusoidal signal 1158 during one complete addressing cycle by digital sawtooth 916. Thus, the frequency of the signal produced by ROM 658 is twice the frequency of the sawtooth signal. As illustrated, sinusoidal signal 1158 has its peak magnitude for the same address for which 1156 has zero value, and has zero value for those addresses for which signal 1156 has maximum value. Consequently, sinusoidal signal 1158 is in phase quadrature with sinusoidal signal 1156, and both are at double the frequency and in a fixed relationship with the sinusoidal signals produced by 1x sine and cosine ROMs 652 and 654.

As a result of the simultaneous addressing of ROMs 652-658 by digital sawtooth waveform 916 on conductor d, signals $I_1$ and $Q_1$ are produced in a fixed phase relationship and in the same frequency with sawtooth 916, and signals $I_2$ and $Q_2$ are produced in a fixed phase relationship and at double the frequency. A step change in phase of sawtooth waveform 916 such as that produced by adder 648 in response to a word contained in latch 650 causes a simultaneous step change in phase to a new phase of demodulating signals $I_1$ and $Q_1$ and double frequency demodulating signals $I_2$ and $Q_2$. This step change in phase at the end of each frame interval allows demodulation of the one-frame delayed signal by signals $I_1$ and $Q_1$ which are essentially phase coherent with the data carrier signal. Consequently, low noise phase coherent demodulation of data signals modulated onto a carrier which drifts in phase is accomplished in the described manner.

As described, the programming of ROMS 656 or 658 produces two cycles of sinusoid for each monotonic scan by a single ramp of sawtooth signal 916. This programming is used when the arrangement of FIG. 6 is to be used for demodulating signals modulated by FSK, BPSK or MSK signals. When the arrangement of FIG. 6 is to be used for demodulation of QPSK signals or OQPSK signals, frequency multiplier 624 multiplies by four rather than by two, and the programming of each of ROMS 656 and 658 is arranged to produce four complete cycles of sinusoid for each complete monotonic scan of the addresses by a ramp of sawtooth waveform 916. As described in conjunction with FIG. 11, for demodulation of QPSK and OQPSK signals the memory contents of ROMS 656 and 658 is arranged for phase quadrature of the resulting components, which are termed $I_4$ and $Q_4$.

Figure 12:
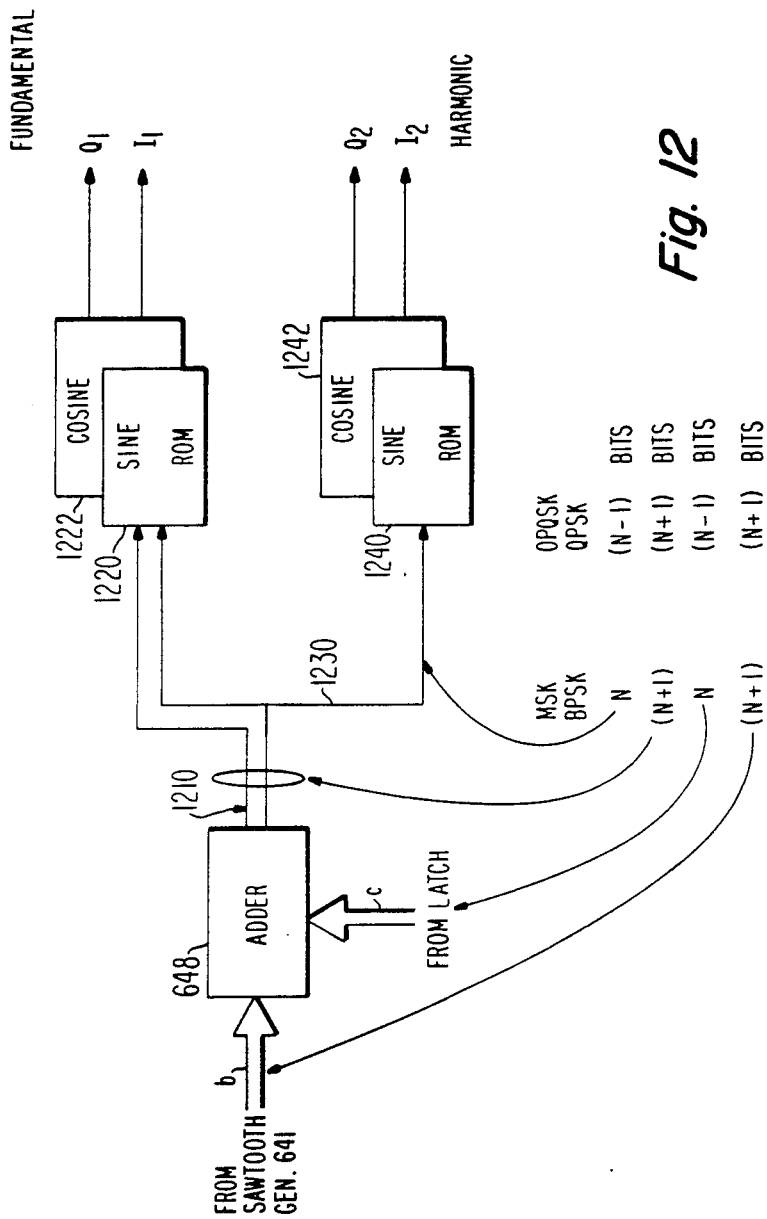
FIG. 12 illustrates an alternate embodiment of the invention and tabulates characteristics thereof for processing various types of signals.

As so far described, the generation of the carrier frequency demodulation signal and of the double frequency modulation signal is accomplished by a memory arrangement which is addressed simultaneously by the entirety of a monotonically applied digital ramp signal. FIG. 12 illustrates an alternative arrangement in which certain portions of the memory are addressed by the entirety of the digital ramp signals, and other portions are addressed by less than the total number of bits of the digital sawtooth signal. This arrangement has the advantage by comparison with the arrangement of FIG. 6 that the same memory types may be used for generating the double frequency demodulating signals as the fundamental frequency signals.

FIG. 12 illustrates a portion of the arrangement of FIG. 6 including adder 648 arranged for receiving over a conductor b digital words which together represent a digital sawtooth signal from generator 641. Adder 648 adds to each digital word received over conductor b a digital word applied over conductor c. Adder 648 adds together the digital words on conductors b and c to produce on an output conductor set 1210 a sum word. All the bits of the sum word are applied as addresses to the address input terminals of a sine ROM 1220 and a cosine ROM 1222 to produce $I_1$ and $Q_1$, respectively. A subset of the total number of bits on conductor set 1210 is applied over a conductor set 1230 as addresses to a sine ROM 1240 and to a cosine ROM 1242. In accordance with one aspect of the invention, ROMs 1240 and 1242 are addressed by a subset of the set of bits of the sawtooth signal used to address ROM 1220 and 1222. In order for ROMs 1240 and 1242 to produce a double frequency signal by comparison with ROMs 1220 and 1222, ROMs 1240 and 1242 are addressed in parallel by all but the most significant bit (MSB) representing the sawtooth signal on conductor set 1210. Thus, the address input terminals of ROMs 1240 and 1242 are scanned through their addresses twice during each scan of the addresses of ROMs 1220 and 1222.

Figure 13:
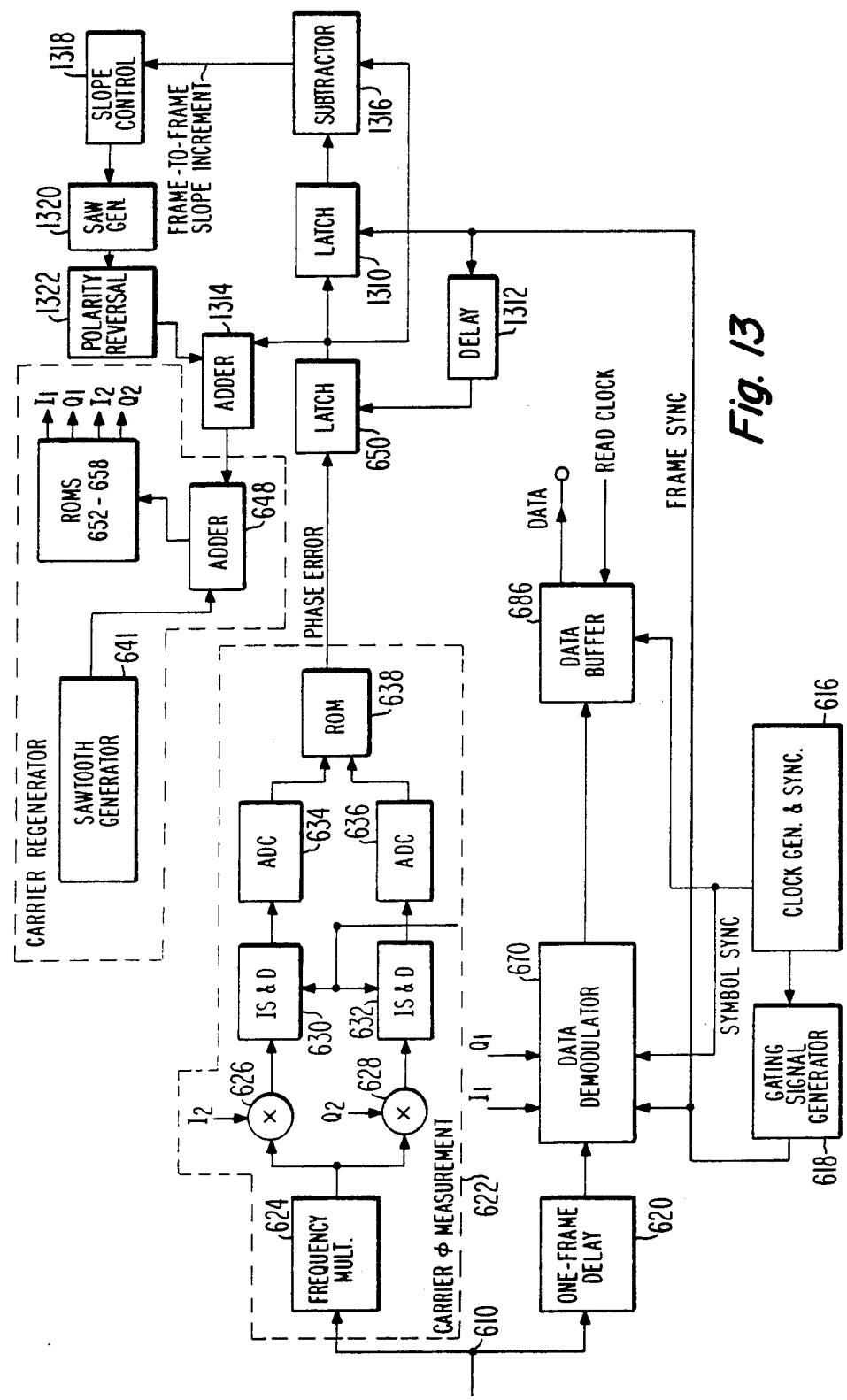
FIG. 13 illustrates another embodiment of the invention providing greater demodulation accuracy.

FIG. 13 illustrates an arrangement for reducing the error in demodulating signal phase under those conditions in which the carrier of the received signal is continually changing in phase in a relatively smooth fashion. Under this condition, the arrangement of FIG. 6 will correct the phase of the demodulating signal relative to the received carrier in such a fashion that the phases converge toward the correct phase, become precisely correct at some point during each frame interval, and thereafter diverge. The arrangement of FIG. 13 notes the frame-to-frame divergence and during each frame interval adds a portion of the difference to the raw error signal to create an error signal compensated for the rate of change difference. Elements of FIG. 13 corresponding to those described earlier are designated by the same reference numbers. In the arrangement of FIG. 13, frame signals are applied to a latch 1310 and by way of a delay element 1312 to latch 650. Latch 1310 is coupled to the output of latch 650 and latches the value of the phase error a moment before latch 650 receives the updated phase error at the end of each frame interval. Thus, at the beginning of each frame interval, the output of latch 650 is the phase error calculated during the preceding frame interval, while the output of latch 1310 is the phase error of the penultimate frame. The output of latch 650 is applied as one input to an adder 1314. The output of latches 650 and 1310 are applied to a subtractor 1316 which forms a signal representative of the difference between the phase error signals of the two successive frames. The output of subtractor 1316 is the frame-to-frame phase slope increment signal which is applied to a sawtooth generator 1320 via slope control 1318. The slope control 1318 controls the magnitude of the sawtooth generator's ramp as well as its polarity. A unipolar sawtooth generator will require a polarity reversal block 1322 to accommodate increasing and decreasing carrier frequencies. The output signal from sawtooth generator 1320 is a fine phase correction signal which tends to correct for the phase deviation between the carrier and the demodulating signal during each frame interval. If perfect correction is achieved the frame-to-frame slope increment will be zero.

Other embodiments of the invention will be apparent to those skilled in the art. For example, the signals preprogrammed into memory need not be limited to sinusoidal form but may be square or triangular waves, or in general of any desired waveform. Where polytone modulations having two or more subcarriers are to be demodulated, more than four ROMS may be necessary to generate the requisite number of sinusoids for demodulation. Data rates other than 1200 b/s may be used. While a one-frame delay has been described, multiple frames of delay could be used in conjunction with averaging of carrier phase over multiple frames. The frame duration may be one bit or many bits, depending on the phase stability of the signal being received. Many portions of the illustrated arrangements may be implemented in either analog or digital form, as known; in particular the multipliers and IS&D filters are readily implemented in digital rather than analog form.

What is claimed is:

1. A receiver for information signals including data angle modulated onto a data carrier, comprising:
   storage means coupled for storing said received information signals for a predetermined interval for generating delayed information signals;
   frequency multiplying means coupled for multiplying the frequency of said received information signals by a first integer to generate frequency multiplied signals including a frequency multiplied carrier component;
   a source of recurrent digital sawtooth signals having a recurrence frequency near the frequency of said data carrier;
   first memory means coupled to receive said recurrent digital sawtooth signals for generating first sinusoidal signals at a frequency which is said first integer times said recurrence frequency;
   amplitude multiplying means coupled to said first memory means and to said frequency multiplying means for multiplying said frequency multiplied signals by said first sinusoidal signals to produce first multiplied signals;
   carrier phase determining means coupled to said amplitude multiplying means for determing the relative phase of said carrier during said predetermined interval for generating a carrier phase indicative signal;
   second memory means coupled to said source of recurrent digital sawtooth signals for generating second sinusoidal signals at a frequency which is a second integer multiple of said recurrence frequency;
   phase control means coupled to said source of recurrent digital sawtooth signals and to said carrier phase determining means for correcting the phase of said digital sawtooth signals in such a manner as to bring said first sinusoidal signals into a predetermined phase relationship with said frequency multiplied carrier component, whereby said second sinusoidal signals are in a predetermined phase relationship with said data carrier; and
   demodulating means coupled to said second memory means and to said storage means for demodulating said delayed information signals by means of said second sinusoidal signals.

2. A receiver according to claim 1 wherein:
   said recurrent digital sawtooth signals comprise n bits including a most significant bit and a plurality of less significant bits;
   said second memory means is coupled to be addressed by said n bits and includes a portion which is preprogrammed for generating one cycle of said first sinusoidal signals each time it is addressed in monotonic fashion by said n bits representing said digital sawtooth signals; and
   said first memory means is coupled to be addressed by y bits out of said n bits of said digital sawtooth signal, where y is less than n and excludes at least said most significant bit, and said first memory means includes a portion which is preprogrammed for generating one cycle of said second sinusoidal signals each time it is addressed in monotonic fashion by said y bits representing less significant bits of said digital sawtooth signals.

3. A receiver according to claim 2, wherein:
   said information signals include binary phase shift keyed or minimum-shift keyed modulation onto said data carrier, and
   y is one bit less than n.

4. A receiver according to claim 2, wherein:
   said information signals include quadrature phase shift keyed modulation onto said data carrier; and
   y is two bits less than n.

5. A receiver according to claim 2 wherein:
   said first memory means includes a further portion which is preprogrammed for generating one cycle of a third sinusoidal signal in addition to said one cycle of said first sinusoidal signal, said one cycle of said third sinusoidal signal being generated simultaneously with said one cycle of said first sinusoidal signal and being in phase quadrature therewith; and
   said second memory means includes a further portion which is preprogrammed for generating a one cycle of fourth sinusoidal signal in addition to said second sinusoidal signal, said one cycle of said fourth sinusoidal signal being generated simultaneously with said one cycle of said first sinusoidal signal and being in phase quadrature therewith.

6. A receiver according to claim 5 wherein:
   said amplitude multiplying means comprises first and second amplitude multipliers coupled to said frequency multiplying means for receiving said frequency multiplied signals, said first amplitude multiplier being coupled to said first memory means for receiving said first sinusoidal signal therefrom, and said second amplitude multiplier being coupled to said first memory means for receiving said third sinusoidal signal therefrom.

7. A receiver according to claim 5, wherein:
   said demodulating means comprises first and second amplitude multipliers coupled for receiving said delayed information signals, said first amplitude multiplier being coupled to said second memory means for receiving said second sinusoidal signal therefrom, said second amplitude multiplier being coupled to said second memory means for receiving said fourth sinusoidal signal therefrom.

8. A receiver according to claim 1, wherein said recurrent digital sawtooth signals comprise n bits including a most significant bit and less significant bits;
   said second memory means is coupled to be addressed by said n bits and included a portion which is preprogrammed for generating a single sinusoid each time it is addressed in monotonic fashion by said n bits representing said digital sawtooth signals; and
   said first memory means is coupled to be addressed by said n bits and includes a portion which is preprogrammed for generating y sinusoids each time it is addressed in monotonic fashion by said n bits representing said digital sawtooth signals, where y is an integer multiple of n.

9. A receiver according to claim 8, wherein:
   said information signals include binary phase-shift keyed or minimum-shift keyed modulation onto said data carrier; and
   y equals two.

10. A receiver according to claim 8 wherein:
    said information signals include quadrature phase shift keyed modulation onto said data carrier; and
    y equals four.

11. An arrangement for generating coherent sinusoidal signals, comprising:

sawtooth generating means for generating recurrent digital sawtooth signals;

first memory means coupled to said sawtooth generating means for being addressed thereby, said first memory means being preprogrammed for generating a first sinusoidal signal each complete cycle of which occurs during a time equal to the duration of a first portion of one of said sawtooth signals; and second memory means coupled to said sawtooth generating means for being addressed thereby, said second memory means being preprogrammed for generating a second sinusoidal signal each complete cycle of which occurs during a time equal to the duration of a second portion of said one sawtooth signal, said duration of said second portion being less than said duration of said first portion.

12. An arrangement according to claim 11, wherein:
said digital sawtooth signals are represented by n bits including a most significant bit and less significant bits;

said first memory means is addressed by said n bits for generating said complete cycle of said first sinusoidal signal during a time equal to the duration of a complete cycle of one of said sawtooth signals; and said second memory means is addressed by a plurality less than n of less significant bits representing said second portion of a complete cycle of one of said sawtooth signals for generating said complete cycle of said second sinusoidal signal during a time less than the duration of a complete cycle of one of said sawtooth signals, whereby the effective frequency of said second sinusoidal signal exceeds the frequency of said first sinusoidal signal.

13. An arrangement for generating coherent sinusoidal signals comprising:

sawtooth generating means for generating recurrent digital sawtooth signals represented by n bits including a most significant bit and less significant bits;

first memory means coupled to said sawtooth generating means for being addressed by said n bits, said first memory means being preprogrammed for generating a first sinusoidal signal each complete cycle of which occurs during a time equal to the duration of a complete cycle of recurrent of said sawtooth signals;

second memory means coupled to said sawtooth generating means for being addressed by a plurality less than said n bits, said second memory means being preprogrammed for generating a second sinusoidal signal each complete cycle of which occurs during a time less than the duration of a complete cycle of recurrence of one of said sawtooth signals, whereby the effective frequency of said second sinusoidal signal exceeds the frequency of said first sinusoidal signal;

third memory means coupled to said sawtooth generating means for being addressed by said n bits in synchronism with said first memory means, said third memory means being preprogrammed for generating a complete cycle of a third sinusoidal signal during a time equal to that of said complete cycle of recurrence of said first sinusoidal signal, but at a phase angle therewith other than zero degrees; and fourth memory means coupled to said sawtooth generating means for being addressed by said plurality less than n of said less significant bits representing said second portion of a complete cycle of recurrence of one of said said sawtooth signals in synchronism with said second memory means, said fourth memory means being preprogrammed for generating a complete cycle of a further sinusoidal signal during a time equal to that of said complete cycle of said second sinusoidal signal, but at a phase angle therewith other than zero degrees.

14. An arrangement according to claim 11 wherein:
said digital sawtooth signals are represented by n bits;
said first memory means is addressed by said n bits for generating said complete cycle of said first sinusoidal signal during a time equal to the duration of a complete cycle of one of sawtooth signals; and
said second memory means is addressed by said n bits for generating a time sequence of more than one complete cycle of said second sinusoidal signal during the time of a complete cycle of one of said sawtooth signals.

15. A method for demodulating angle modulation carrier signals including a method for generating coherent sinusoidal signals having different frequencies, said method for generating sinusoidal signals comprising the steps of:

recurrently generating a digital ramp signal to produce a digital sawtooth signal having a frequency related to the rate of recurrence;

applying at least a portion of each of said digital ramp signals for addressing a first memory means preprogrammed at addressed locations with information relating to a complete cycle of a first sinusoidal signal for recurrently producing as an output said first sinusoidal signal to produce recurrent first sinusoidal signals having a frequency related to said rate of recurrence;

applying at least said portion of each said digital ramp signal for addressing a second memory means preprogrammed at addressed locations with information relating to at least one complete cycle of a second sinusoidal signal for recurrently producing as an output said second sinusoidal signal to produce recurrent second sinusoidal signals having a frequency different from and in a fixed ratio to said first sinusoidal signals in response to recurrent simultaneous addressing of said first and second memory means.

16. A method for demodulating angle modulated carrier signals including a method for generating coherent sinusoidal signals having different frequencies, said method for generating sinusoidal signals comprising the steps of:

receiving said angle modulated carrier;

frequency multiplying said angle modulated carrier by a predetermined integer to produce frequency multiplied carrier;

recurrently generating a digital ramp signal to produce a digital sawtooth signal;

applying at least a portion of each of said digital ramp signals as an address to a first memory means preprogrammed at addressed locations with information relating to a complete cycle of a first sinusoidal signal for recurrently producing as an output said first sinusoidal signal to produce first sinusoidal signals;

applying at least said portion of each said digital ramp signal as an address to a second memory means preprogrammed at addressed locations with information relating to more than one complete cycle of a second sinusoidal signal for recurrently producing as an output said second sinusoidal signals, whereby said second sinusoidal signals have a frequency different from and in a fixed ratio at said first sinusoidal signals in response to recurrent addressing of said first and second memory means;

producing mutually quadrature components of said second sinusoidal signals;

demodulating said frequency multiplied carrier with said mutually quadrature components of said second sinusoidal signal to produce two components of demodulated frequency multiplied information;

evaluating for a predetermined interval the ratio of the amplitudes of said two components of said demodulated frequency multiplied information to generate a signal representative of the phase relationship between said mutually quadrature components of said second sinusoidal signal and said frequency multiplied carrier;

adjusting the phase of at least one of said mutually quadrature components of said second sinusoidal signal at the end of said predetermined interval to bring it into substantial phase coincidence with said frequency multiplied carrier;

delaying said angle modulated carrier by said predetermined interval to generate a delayed carrier; and demodulating said delayed carrier by means of said first sinusoidal signals.

17. A method according to claim 16 wherein said fixed ratio is a second integer equal to said predetermined integer.

18. A method according to claim 16 wherein said step of demodulating said delayed carrier comprises the steps of:

generating first and second mutually quadrature components of said first sinusoidal signal;

multiplying said delayed carrier by said first component of said first sinusoidal signal; and multiplying said delayed carrier by said second component of said first sinusoidal signal.

19. A method according to claim 18 wherein said fixed ratio is the integer two and said predetermined integer is two.

20. A method according to claim 18 wherein said fixed ratio is the integer four and said predetermined integer is four.

* * * * *